(12) United States Patent
Watts et al.

(10) Patent No.: US 12,426,099 B2
(45) Date of Patent: Sep. 23, 2025

(54) IDLE/INACTIVE MOBILITY FOR SMALL DATA TRANSMISSION

(71) Applicant: InterDigital Patent Holdings, Inc., Wilmington, DE (US)

(72) Inventors: Dylan Watts, Montreal (CA); Faris Alfarhan, Montreal (CA); Loic Canonne-Velasquez, Dorval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 416 days.

(21) Appl. No.: 18/019,888

(22) PCT Filed: Aug. 4, 2021

(86) PCT No.: PCT/US2021/044486
§ 371 (c)(1),
(2) Date: Feb. 6, 2023

(87) PCT Pub. No.: WO2022/031809
PCT Pub. Date: Feb. 10, 2022

(65) Prior Publication Data
US 2023/0284289 A1 Sep. 7, 2023

Related U.S. Application Data

(60) Provisional application No. 63/061,662, filed on Aug. 5, 2020, provisional application No. 63/093,991, filed on Oct. 20, 2020.

(51) Int. Cl.
*H04W 74/0833* (2024.01)
*H04W 72/231* (2023.01)
*H04W 76/19* (2018.01)

(52) U.S. Cl.
CPC ....... *H04W 74/085* (2013.01); *H04W 72/231* (2023.01); *H04W 76/19* (2018.02)

(58) Field of Classification Search
CPC . H04W 74/085; H04W 72/231; H04W 76/19; H04W 72/23; H04W 74/0836;
(Continued)

(56) References Cited

U.S. PATENT DOCUMENTS

2024/0349302 A1* 10/2024 Sha .................. H04W 72/1273

OTHER PUBLICATIONS

3rd Generation Partnership Project (3GPP), R2-1910173, "Report of email discussion [106#59] [R16 NB-IoT/eMTC] D-PUR Procedural steps", 3GPP TSG-RAN WG2 Meeting #107, Huawei, Prague, Czech Republic, Aug. 25-30, 2019, 25 pages.
(Continued)

*Primary Examiner* — Kyaw Z Soe
(74) *Attorney, Agent, or Firm* — Condo Roccia Koptiw LLP

(57) ABSTRACT

A WTRU operating in an inactive state may be associated with a first cell. The WTRU may be configured to receive configuration information for a time period associated with small data transmission failure detection and a search space associated with small data transmission. The WTRU may be configured to send a first small data transmission and start the time period. The WTRU may be configured to monitor for a downlink transmission in the search space during the time period. If a condition for cell reselection is satisfied during the time period or the restarted time period, the WTRU may be configured to suspend a data radio bearer (DRB) associated with small data transmission, select a second cell, perform a random access procedure associated with the second cell, and send a small data transmission. The random access procedure may include sending a request to resume a radio resource control (RRC) connection.

15 Claims, 5 Drawing Sheets

(58) Field of Classification Search
CPC . H04W 74/0833; H04W 76/27; H04W 48/20; H04W 72/1268
See application file for complete search history.

(56) References Cited

OTHER PUBLICATIONS

3rd Generation Partnership Project (3GPP), R2-1912411, "Remaining Issues for D-PUR Signaling Procedure", 3GPP TSG RAN WG2 Meeting #107bis, Nokai, Nokia Shanghai Bell, Chongqing, China, Oct. 14-18, 2019, 3 pages.

3rd Generation Partnership Project (3GPP), R2-2010109, "Small data transmission failure and cell reselection", 3GPP RAN WG2 Meeting #112e, InterDigital, eMeeting, Nov. 2-13, 2020, 4 pages.

3rd Generation Partnership Project (3GPP), R2-2105575, "Control plane common aspects for SDT", 3GPP TSG-RAN WG2 #114-e, Huawei, HiSilicon, E-meeting, May 19-27, 2021, 17 pages.

3rd Generation Partnership Project (3GPP), TR 36.889 V16.0.0, "Study on NR-Based Access to Unlicensed Spectrum", Dec. 2018, pp. 1-119.

3rd Generation Partnership Project (3GPP), TS 36.213 V15.0.0, "Technical Specification Group Radio Access Network, Evolved Universal Terrestrial Radio Access (E-UTRA), Physical layer procedures (Release 15)", Dec. 2017, pp. 1-493.

3rd Generation Partnership Project (3GPP), TS 36.300 V15.10.0, "Technical Specification Group Radio Access Network, Evolved Universal Terrestrial Radio Access (E-UTRA) and Evolved Universal Terrestrial Radio Access Network (E-UTRAN), Overall description, Stage 2 (Release 15)", Jul. 2020, pp. 1-365.

3rd Generation Partnership Project (3GPP), TS 36.331 V15.10.0, "Technical Specification Group Radio Access Network, Evolved Universal Terrestrial Radio Access (E-UTRA), Radio Resource Control (RRC), Protocol specification (Release 15)", Jul. 2020, pp. 1-965.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project, TS 38.214 V15.10.0, "Technical Specification Group Radio Access Network, NR, Physical Layer Procedures for Data (Release 15)", Jun. 2020, pp. 1-106.

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.

3rd Generation Partnership Project, TS 38.331 V15.10.0, "Technical Specification Group Radio Access Network, NR, Radio Resource Control (RRC) protocol specification (Release 15)", Jul. 2020, pp. 1-539.

* cited by examiner

IDLE/INACTIVE MOBILITY FOR SMALL DATA TRANSMISSION

CROSS-REFERENCE TO RELATED APPLICATIONS

This application is the National Stage Entry under 35 U.S.C. § 371 of Patent Cooperation Treaty Application No. PCT/US2021/044486, filed Aug. 4, 2021, which claims the benefit of Provisional U.S. Patent Application Ser. No. 63/061,662, filed Aug. 5, 2020, and Provisional U.S. Patent Application No. 63/093,991, filed Oct. 20, 2020, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems and methods are described herein for a moving wireless transmit/receive unit (WTRU) in idle or inactive mode to perform uplink (UL) and/or downlink (DL) small data transmission (e.g., without transitioning to connected mode). The WTRU may be associated with a first cell. The WTRU may operate in an inactive state. The WTRU may include a processor. The processor may be configured to receive configuration information for a time period and a search space. For example, the time period may be associated with small data transmission failure detection and the search space may be associated with small data transmission. The processor may be configured to send a first small data transmission and start the time period. The processor may be configured to monitor for a downlink transmission in the search space during the time period. If the downlink transmission is received during the time period, the processor may be configured to send a second small data transmission and restart the time period. For example, the downlink transmission may include an uplink transmission grant. If a condition for cell reselection is satisfied during the time period or the restarted time period, the processor may be configured to suspend a data radio bearer (DRB) associated with small data transmission, select a second cell, perform a random access procedure associated with the second cell, and send a small data transmission. For example, the random access procedure is associated with small data transmission and includes sending a request to resume a radio resource control (RRC) connection.

DETAILED DESCRIPTION

Figure 1A:
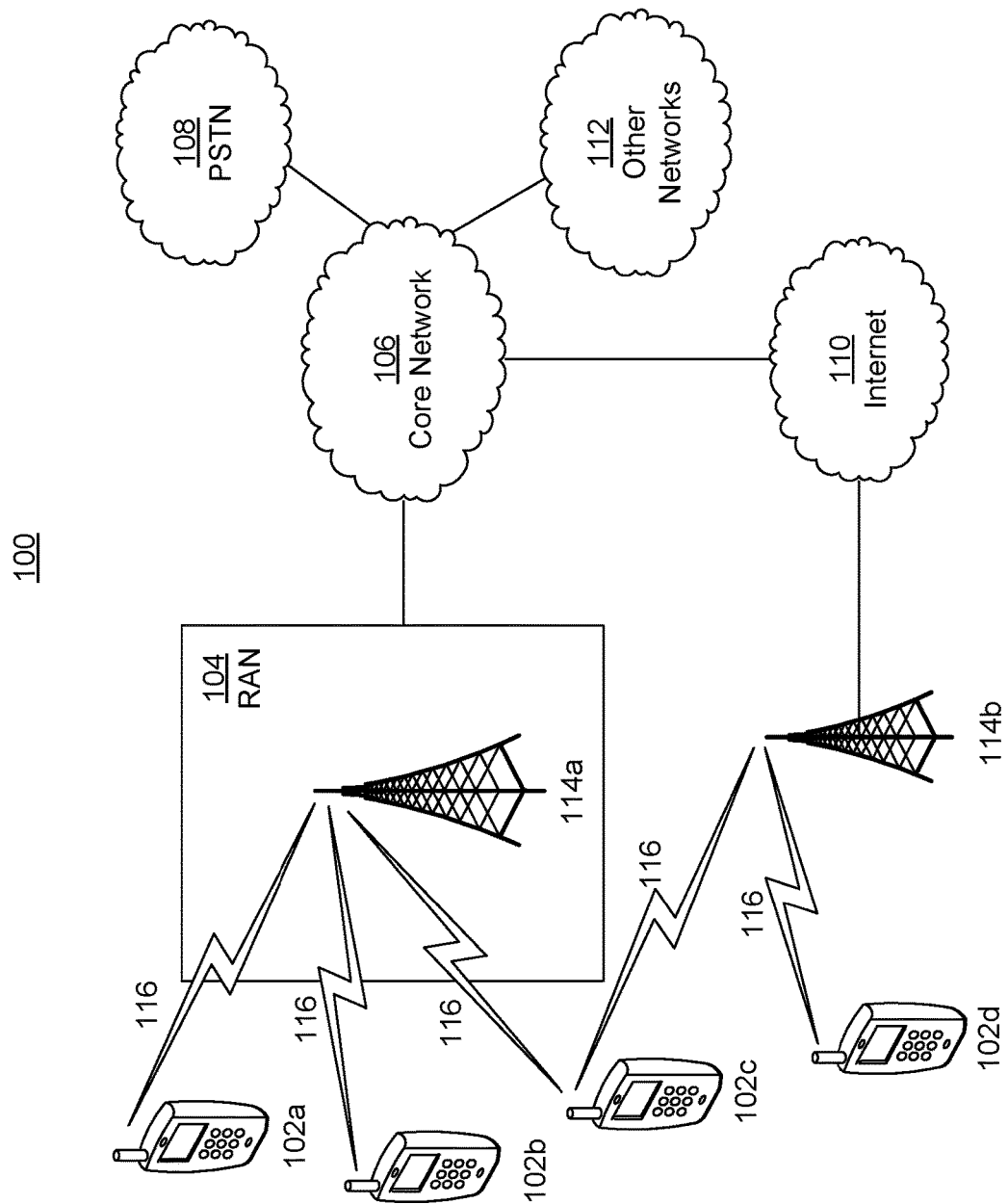
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access , which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
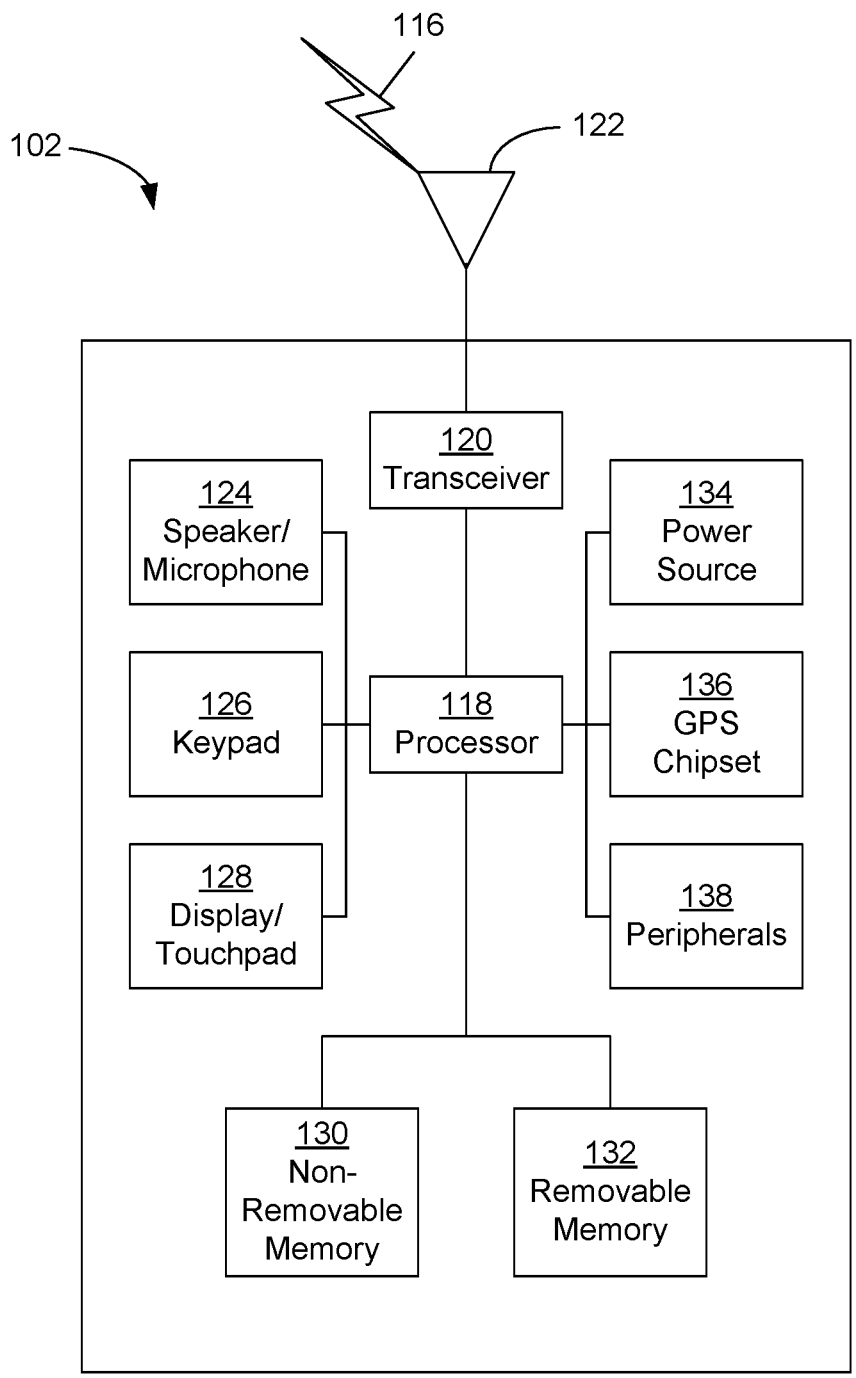
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
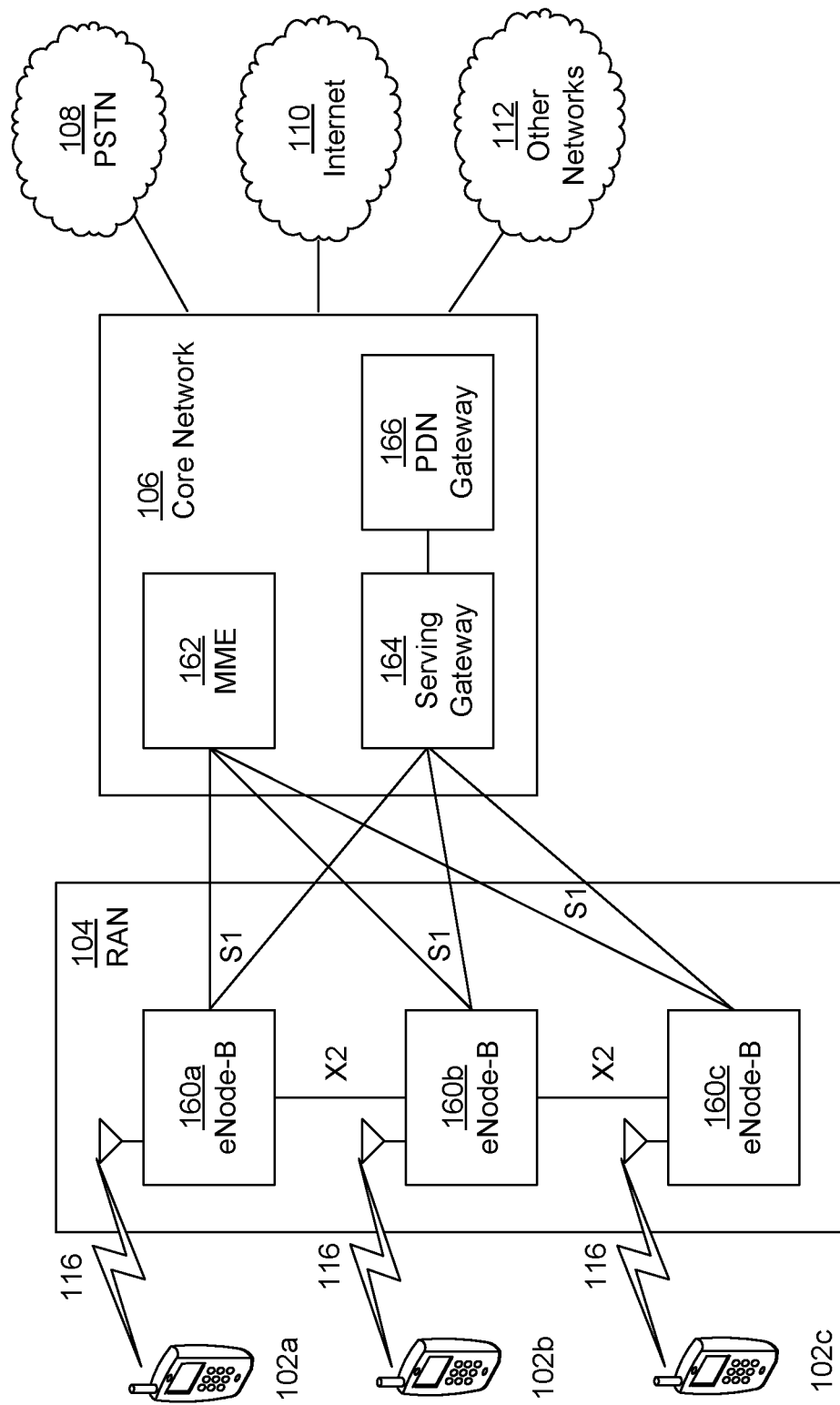
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
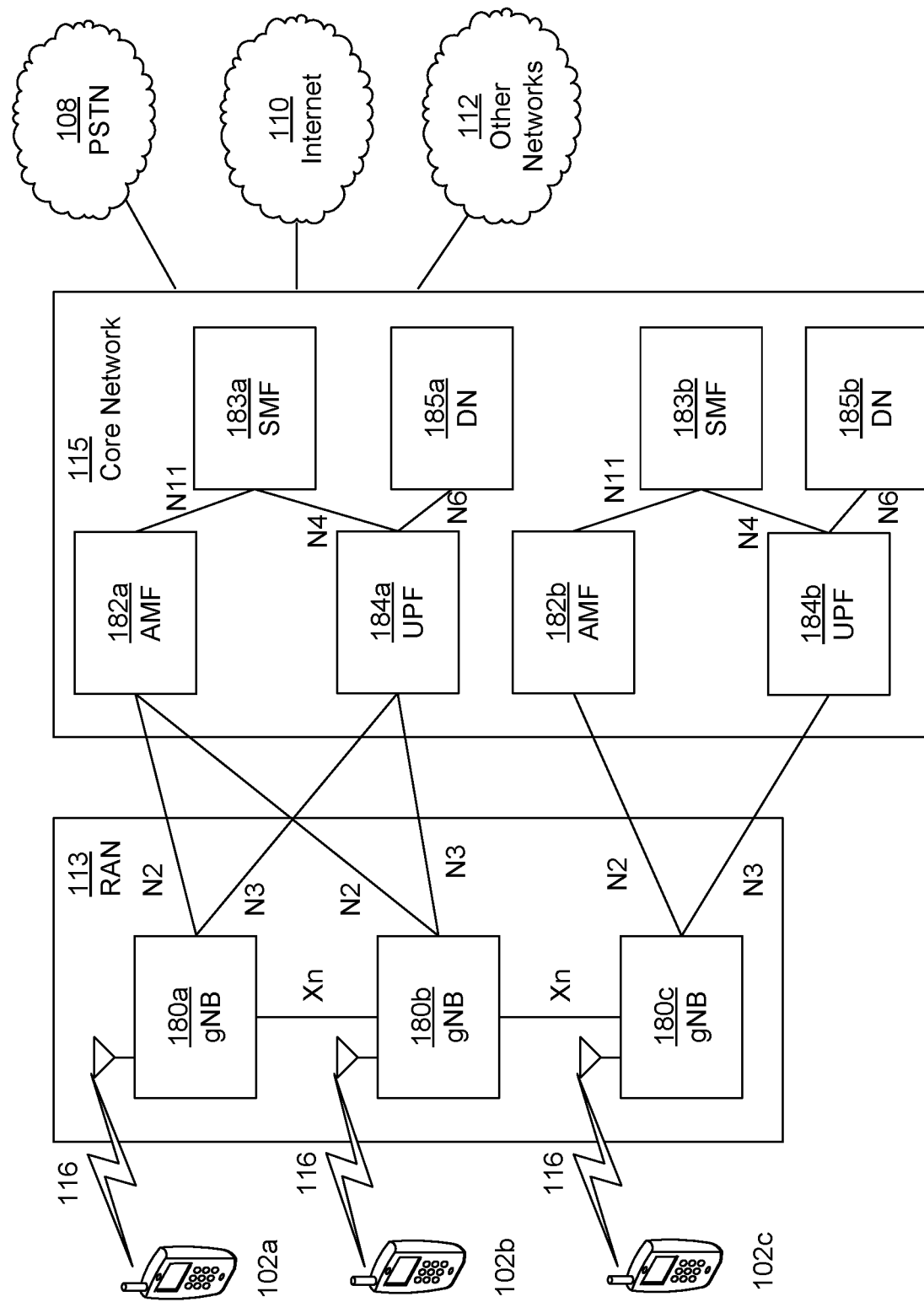
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems and methods are described herein for a moving wireless transmit/receive unit (WTRU) in idle or inactive mode to perform uplink (UL) and/or downlink (DL) small data transmission (e.g., without transitioning to connected mode). The WTRU may select resources that are shared with multiple cells, such as, for example, resources from a random access channel (RACH) procedure or configured grant (CG) resources, for small data transmission. The WTRU may maintain the same WTRU context (e.g., user equipment (UE) context) from the last serving cell while transferring to a target cell. The WTRU may assist maintaining of the same WTRU context, for example, by storing network-stored WTRU context and providing that context to a target cell. The WTRU may interrupt an ongoing small data transmission and/or transition to a different cell in cases such as, for example, when channel condition measurements of the serving cell fall below a threshold, when channel condition measurements of a target cell are above a threshold, and/or when a target cell on which the small data transmission can be resumed is in the same radio access network (RAN)-based notification area (RNA).

A WTRU may be provided with a ciphering algorithm and key, and/or an integrity protection algorithm and key, for example, for a PDCP entity re-establishment. The ciphering/integrity key may include a temporary or one shot ciphering/integrity key to be applied to a data radio bearer(s) (DRB(s)) configured for a small data transmission (SDT), for example, if the SDT is sent to a gNB where integrity or ciphering has not been set up (e.g., a receiving gNB other than the last serving gNB).

The WTRU may apply an algorithm to the initial small data transmission to a receiving gNB, for example, if the WTRU attempts a small data transmission(s) to a gNB other than the last serving gNB, A WTRU may start a timer (e.g., a SDT) timer), for example, after transmitting a small data package data unit (PDU). After an expiry of the SDT timer and/or selecting a cell (e.g., a cell different from the current cell) while the SDT timer is running, the WTRU may perform one or more of the following: perform RRC re-establishment, initiate a random access procedure, transition in IDLE mode, trigger an radio link control (RLC) or PDCP retransmission.

Transitioning from inactive mode into connected mode to send a small amount of data on a WTRU may be associated with signaling in the network and battery consumption. For example, on a WTRU supporting eMBB services, applications may have frequent background small data (e.g. app refresh data, notifications, etc.), which may be periodic or aperiodic. For example, sensors and IoT-enabled WTRUs may have considerable amount of signaling and small data (e.g. periodic heartbeat or stay-alive signals, surveillance updates, periodic video stream, non-periodic video based on motion sensing, etc.). Such WTRUs may aim to reduce battery consumption. Such WTRUs may experience battery consumption due to transitioning from inactive mode to connected mode.

Inactive mode and RRC_INACTIVE state may be used interchangeably herein. Connected mode and RRC_CONNECTED state may be used interchangeably herein.

With 2-step random access (RA), configured grants (CGs), etc. supported in NR, UL and/or DL small data transmission, may be enabled, for example, without necessarily transitioning to connected mode. For example, data transmission without WTRU-initiated state transitions (e.g., radio resource control (RRC) state transitions) for UL and/or DL may be supported. Transmission of small data in UL, subsequent transmission of small data in UL and/or DL, and/or the state transition decisions may be under network control. For example, CGs may be allocated to WTRUs in RRC_INACTIVE state. For example, 2-step RA or 4-step RA may be used to enable UL and/or DL small data transmission, e.g., in RRC_INACTIVE state.

The WTRU context in RRC_INACTIVE state may include the configuration of data radio bearers (DRB), logical channels, and/or security information. The WTRU may keep all or a part of its WTRU context in inactive and/or idle mode. Some DRBs may be suspended in inactive or idle mode.

Channel state information may be referred to as CSI. Channel state information may include at least one of the following: a channel quality index (CQI), a rank indicator (RI), a precoding matrix index (PMI), a L1 channel measurement (e.g. a measurement of RSRP such as L1-RSRP, or a measurement of SINR), a CSI-RS resource indicator (CRI), a SS/PBCH block resource indicator (SSBRI), a layer indicator (LI) or any other measurement quantity measured by the WTRU from a configured CSI-RS or SS/PBCH block.

Uplink control information may be referred to as UCI. Uplink control information may include: CSI, HARQ feedback for one or more HARQ processes, a scheduling request (SR), a link recovery request (LRR), a CG-UCI or other control information bits that may be transmitted on a PUCCH or PUSCH.

Channel conditions may be conditions (e.g., any conditions) relating to a state of a radio channel. which may be determined by a WTRU from: a WTRU measurement (e.g., a measurement of L1/SINR/RSRP, CQI/MCS, channel occupancy, RSSI, power headroom, or exposure headroom), L3/mobility-based measurements (e.g. RSRP, RSRQ), an RLM state, or channel availability in unlicensed spectrum (e.g. whether the channel is occupied based on a determination of an LBT procedure or whether the channel is deemed to have experienced a consistent LBT failure (e.g., a LBT failure occurred multiple times during a time duration)).

A PRACH resource may be a PRACH resource in frequency, a PRACH occasion (RO) (e.g., in time), a preamble format (e.g., in terms of total preamble duration, sequence length, guard time duration and/or in terms of length of cyclic prefix), or a certain preamble sequence used for the transmission of a preamble in a random access procedure.

Small data may be UL-synchronization (SCH) data (non-common control channel (CCCH)) transmitted by a WTRU in non-connected mode. A small data transfer procedure may constitute UL and/or DL data transmitted in inactive or idle state, which may be with a preamble transmission (e.g. that is part of a random-access procedure) or without a preamble transmission (e.g. on preconfigured CG resources).

MsgA may be preamble and payload transmissions on PRACH and PUSCH resources, respectively, in a 2-step RA procedure.

MsgB may be a downlink response to MsgA, which may be a success Re-Auth-Request (RAR), a fallback RAR, or a backoff indication.

A property of scheduling information (e.g., an uplink grant or a downlink assignment) may consist of at least one of the following: a frequency allocation; an aspect of time allocation, such as a duration; a priority; a modulation and coding scheme; a transport block size; a number of spatial layers; a number of transport blocks to be carried; a TCI state or SRI; a number of repetitions; or whether the grant is a configured grant type 1, type 2, or a dynamic grant.

An indication by DCI may consist of at least one of the following: an explicit indication by a DCI field or by a RNTI used to mask CRC of a PDCCH; or an implicit indication by a property such as a DCI format, a DCI size, a Coreset or search space, an aggregation level, an identity of a first control channel resource (e.g., an index of a first CCE) for a DCI, where a mapping between the property and an associated value may be signaled by RRC or MAC.

In RRC_IDLE and/or RRC_INACTIVE state(s), cell selection and/or cell re-selection may be controlled by the WTRU, e.g., based on measurements on synchronization signal blocks (SSBs). If the WTRU is released to RRC_INACTIVE state, the last serving base station (e.g., the last serving gNB) may retain the WTRU Context. If the WTRU attempts to access another cell, the receiving base station (e.g., the receiving gNB) may trigger the Xn application protocol (XnAP) Retrieve WTRU Context procedure to receive the WTRU context from the last serving base station (e.g., the last serving gNB), e.g., as long as the receiving base station is within the radio access network (RAN) notification area (RNA) of the last serving station.

A WTRU in RRC IDLE or RRC_INACTIVE state may maintain a connection to the network, e.g., to transmit small data. The WTRU may set up a WTRU context at a target base station (e.g., a target gNB), determine which resources the WTRU may transmit to a target base station (e.g., the target gNB), and/or determine when to interrupt ongoing small data transmission and attempt retransmission on an alternative cell.

The network may not be aware that a WTRU has UL data to transmit. The WTRU may not be aware that the network has DL data to transmit. WTRU mobility may be controlled by the WTRU in RRC_IDLE state and/or RRC_INACTIVE state. The WTRU may avoid performing cell (re)selection to a target base station (e.g., a target gNB) when the last serving base station (e.g., the last serving gNB) still has DL small data to transmit. The network may be prevented from ordering the WTRU to release the RRC configuration or perform an next-generation (NG) reset when the WTRU has UL data to transmit.

A WTRU may select UL resources based on (e.g., wherein in examples herein based on may be in response to) mobility in RRC_IDLE and RRC_INACTIVE states. For example, a WTRU may be attached to a serving cell. While moving, the WTRU may determine that another cell (e.g., a target cell) may be better suited as a serving cell. The WTRU may attach to the target cell. A WTRU may not know which resources may be used on the target cell for small data transmission. The resources may include time slots, frequency locations, and/or spatial filter parameters. The resources may include configured grants. A WTRU may select resources that are shared with multiple cells. For example, the WTRU may determine the resources available on neighboring cells based on a system information block (SIB). For example, the WTRU may read a SIB which may include information on neighboring cells. The WTRU may determine the neighboring cells' available resources based on the SIB. The available resources may be indexed for use in RRC_IDLE and/or RRC_INACTIVE state.

The WTRU may determine the resources based on the RNA index and/or a list of cells. The WTRU may determine the resources based on the RNA index. An RNA index may be associated with resources. Cells that share the same RNA index may utilize the same configuration of resources. For example, when a WTRU moves to a target cell, it may determine which RNA the cell belongs to. The WTRU may determine to use the same resources as the serving cell if the target cell belongs to the same RNA as the original serving cell. For example, the resources may be located at the first resource block (RB) in even slots with a default spatial relation. For example, the WTRU may determine the index of the configured grant to use by determining the RNA and the configured grant indices tied to the RNA. The WTRU may, have acquired the configuration of resources from a previous RRC_CONNECTED state through a cell (e.g., any cell) in the RNA.

The WTRU may determine resources based on a list of cells. For example, the WTRU may receive a list of cells when released from RRC_INACTIVE state. The WTRU may determine that the cells (e.g., all the cells) within the list may share the same resources. The list of cells may be different from the cells in the RNA list.

The WTRU may determine a list of available resources, which may be available at multiple cells. The WTRU may determine which available resources to use from the list as WTRU-specific or shared with multiple WTRUs.

In the case of determining WTRU-specific available resources, the WTRU may determine the location of its resources as a function of the inactive-radio network temporary identifier (I-RNTI). For example, a function may map a WTRU's I-RNTI value to a subset of the resources provided. A WTRU may be configured with a configuredGrantConfig information element (IE). The configuredGrantConfig IE may include a subset of CGs that may be flagged (e.g., identified) as available for RRC_IDLE and/or RRC_INACTIVE state. The WTRU may determine from the flag which resources may be used when in RRC_IDLE or RRC_INACTIVE state.

In the case of determining available resources shared with multiple WTRUs, the WTRU may determine a subset of resources through a random selection of resources. The random selection may be initialized with a seed. For example, a WTRU may use the I-RNTI value to initialize a random number generator. An output of the generator may point to one or multiple resources. For example, a WTRU may determine a preconfigured pattern determined as a function of the I-RNTI value.

The available resources may be shared among users For example, a WTRU may scramble its data with its I-RNTI. The WTRU may use a subset or all resources to spread its data that has been scrambled with I-RNTI. Multiple WTRUs may use overlapping resources, and a base station (e.g., a gNB) may differentiate users based on the I-RNTI.

A WTRU may determine one or multiple available resources for data transmission. The WTRU may have a choice of which resource to use. For example, the WTRU may determine that multiple (e.g., two) resource sets are available. It may be unclear which set may be used in the target cell. Depending on different conditions, the WTRU may use one resource over the other. The WTRU need to (e.g., may be restricted to) evaluate a further condition before determining when and/or on which resources to send data. For example, a WTRU may determine to send data on a subset of resources based on a channel quality value, channel capability restrictions, WTRU velocity (e.g., via an internal accelerometer), and/or a frequency of cell reselection.

The WTRU's determination of sending data on the subset of resources may be based on a channel quality value, such as, a synchronization signal block's reference signal received power (SSB-RSRP) value or a SSB's reference signal received quality (SSB-RSRQ)) value. The WTRU may determine to send data if the channel quality value at the target cell exceeds a threshold.

The WTRU's determination of sending data on the subset of resources may be based on channel capability restrictions. For example, the channel capability restrictions may be provided in a WTRU context based on (e.g., wherein in examples herein based on may be in response to) the WTRU's release to RRC_INACTIVE state.

The WTRU's determination of sending data on the subset of resources may be based on WTRU velocity. For example, a WTRU may determine that it is in high mobility scenarios. Based on the determination, the WTRU may use random access channel (RACH)-based resources. Based a determination that the WTRU is in low mobility scenarios, the WTRU may use resources which may not require timing advance.

The WTRU's determination of sending data on the subset of resources may be based on frequency of cell reselection. A WTRU may determine that it may use a subset of resources when a number of cell reselections is above a threshold. If a WTRU determines that the target cell is the Nth cell within the last T seconds, the WTRU may wait for a duration before sending data.

A WTRU may determine to use fallback resources if the WTRU determines that a CG resource is not available. For example, a WTRU may determine to use a CG resource based on (e.g., wherein in examples herein based on may be in response to) a cell reselection for UL data. A WTRU's transmission may not be successful (e.g. no acknowledgement (ACK) and/or negative ACK (NACK)). In such an example scenario, the WTRU may use another method to send data. The WTRU may attempt to read CG occasions via a SIB. A SIB on the target cell may include a list of CG resources. A WTRU may fall back and re-attempt to send data using a RACH based procedure. The WTRU may re-attempt using a 4-step random access (4SR) procedure. The WTRU may use 2-step random access (2SR) and fall back to 4SR if unsuccessful. The WRTU may determine a priority between 4SR and 2SR based on a channel quality threshold (e.g. a RSRP threshold). The WTRU may fall back to a 4SR if a CG is already attempted and failed. The WTRU may be restricted to using RACH procedures when switching to a target cell.

A WTRU in RRC_IDLE and/or RRC_INACTIVE state may interrupt an ongoing small data transfer procedure.

For example, a WTRU may perform layer 1 (L1) or layer 3 (L3) measurements during and/or after initiating small data transfer procedure. The L1 or L3 measurements may be performed using a configured set of measurement resources to estimate channel conditions (e.g. channel state information (CSI) resource sets and/or SSB resources). The WTRU may stop an ongoing small data transfer procedure and/or transition to a different cell, for example, if measurement of channel conditions fall below a threshold from the serving cell on which the procedure is ongoing, measured channel conditions from another serving cell of the same base station (e.g., the same gNB) is above another configured threshold or within range, measured channel conditions from another cell in a different base station (e.g., a different gNB) are above a threshold, and/or the difference between measured channel conditions from a source cell and a different cell is not at (e.g., is below or above) a configured threshold and/or within a range.

The WTRU may stop or transfer an ongoing small data transfer procedure, for example, if the WTRU has not received control messages from or exchanged control messages with (e.g. MsgA, MsgB, Msg2, msg3, msg4, or a downlink control information (DCI) indication in response to the small data or preamble transmission) the serving cell on which the small data transfer procedure is ongoing.

The WTRU may stop or transfer the ongoing small data transfer procedure, for example, if a number of uplink transmission attempts (e.g. a number of preamble transmissions, a number of MsgA transmissions, or a number of physical uplink shared channel (PUSCH) (re)-transmissions) has exceeded a configured threshold and/or is within a range. The WTRU may fall back to the source serving cell on which the small data transfer procedure was stopped, for example, if measured channel conditions are above a configured threshold and/or within a range. The WTRU may fall back to the source serving cell on which the small data transfer procedure was stopped, for example, if the WTRU doesn't receive a response (e.g. MsgB, Msg2, msg4, or a DCI indication in response to the small data or preamble transmission) from a base station (e.g., a new base station, which may be a new gNB) or a cell (e.g., a new cell), on which the transferred small data transfer (e.g., the new small data transfer procedure) was initiated.

The WTRU may stop or transfer the ongoing small data transfer procedure, for example, if the target cell on which the new small data procedure is initiated (or the target cell on which the ongoing small data transfer procedure is transferred to) is part of a same RNA (or on a different RNA), part of the same cell group, and/or part of a same packet data convergence protocol (PDCP) entity. The WTRU may stop or transfer the ongoing small data transfer procedure, for example, if an RRC connection establishment or an RRC reestablishment is not required. The WRTU may stop or transfer the ongoing small data transfer procedure, for example, if the WTRU context and/or I-RNTI is applicable (or known) by the new target cell (e.g., if a context update is not required). The WTRU may stop or transfer the ongoing small data transfer procedure, for example, if the WTRU context can be obtained and/or updated at the target cell prior to (or during) the small data transfer procedure. The WTRU may stop or transfer the ongoing small data transfer procedure, for example, if the small data payload includes data from identified DRBs, identified signal radio bears (SRBs), a subset of identified DRBs, a subset of identified SRBs, and/or a subset of identified logical channels (LCHs).

The WTRU may initiate a new small data transmission procedure and/or resume an ongoing small data transmission procedure based on (e.g., wherein in examples herein based on may be in response to) re-initiating a small data transfer procedure on a cell (e.g., a new cell), a cell group (e.g., a new cell group), a base station (e.g., a new base station, which may be a new gNB), and/or a BWP (e.g., a new BWP). If the WTRU initiates a new procedure, the WTRU may initiate a small data transfer procedure that involves a preamble transmission. The WTRU may initiate a small data transfer procedure that involves a preamble transmission, for example, if one or more of the following conditions are met: a timing advance is invalid and/or unknown by the WTRU; an RRC message exchange is required; a WTRU context exchange is required; and/or a previous procedure (e.g., a most recent previous procedure) was based on small data transfer without a preamble. The WTRU may initiate a small data transfer without a preamble procedure, for example, if a previous procedure (e.g., the most recent previous procedure) was not a random access procedure and/or an uplink timing advance is maintained, known, or not required.

A WTRU may maintain an RRC configuration during connection issues on a serving cell.

Reference to a timer herein may refer to a time, a time period, tracking the time, tracking the period of time, etc. Reference to a timer expiration herein may refer to determining that the time has occurred or that the period of time has expired.

Reference to a counter herein may refer to a number of event occurrences, tracking the number of event occurrences, etc. Reference to a counter expiration herein may refer to determining that the number of event occurrences has reached or exceeded a pre-defined limit.

The WTRU may start a small data transmission on a source serving cell, with a preamble (e.g. as a part of a RA procedure) or without preamble (e.g. based on a CG transmission). The WTRU may start a timer or counter (e.g. a transition timer) based on (e.g., wherein in examples herein based on may be in response to), for example, based on receiving a response from a base station (e.g., a gNB) confirming the successful reception of small data transmission or based on receiving an indication from the base station (e.g., the gNB) addressed to the WTRU. Based on (e.g., wherein in examples herein based on may be in response to) an expiry of such transition timer, the WTRU may attempt to stop the ongoing small data transfer procedure (e.g. an RA procedure or a CG (re)-transmission) and/or initiate a small data transfer procedure (e.g., a new small data transfer procedure) on or using a different serving cell, a different bandwidth part (BWP), and/or a different base station (e.g., a different gNB).

The WTRU may maintain a transition counter, e.g. for determining timer expiry. The WTRU may increment the counter once per period or per (re)-transmission attempt. Based on (e.g., wherein in examples herein based on may be in response to) reaching a certain number of retransmission attempts (e.g., a counter value configured by upper layer(s)), the WTRU may attempt to stop the ongoing small data transfer procedure (e.g. an RA procedure or a CG (re)-transmission) and/or initiate a new small data transfer procedure on or using a different serving cell, a different BWP, and/or a different base station (e.g., a different gNB). For example, the WTRU may stop or transfer the ongoing small data transfer procedure to a different cell and/or BWP, for example, if the latency budget associated with the LCHs that are included in the small data PDU is exceeded.

For example, the WTRU may be preconfigured to stop or transfer the ongoing small data transfer procedure to another cell, another cell group, another base station (e.g., another gNB), and/or another BWP, for example, if at least one of the following conditions is satisfied. A condition may be satisfied if the WTRU has exceeded a configured number of preamble transmission attempts (for example, based on a preamble transmission counter). A condition may be satisfied if the WTRU has exceeded a configured number of MsgA transmission attempts (for example, based on a MsgA transmission counter). A condition may be satisfied if the WTRU has exceeded a configured number of PUSCH (re)-transmissions. A condition may be satisfied if the WTRU has exceeded a configured number of LBT failures for transmissions that are part of the small data transfer procedure (e.g. via PRACH or PUSCH). A condition may be satisfied if the WTRU has not received a response from the base station (e.g., gNB), such as msg2, msg4, msgB, or a DCI indication in response to an uplink transmission (e.g., any uplink transmission) related to the small data transfer procedure. A condition may be satisfied if the small data transition timer initiated by the WTRU has expired, or time elapsed since the WTRU initial transmission attempt has exceeded a threshold, which the threshold may be configured (e.g., per logical channel (LCH) or DRB). A condition may be satisfied if measured channel condition(s) from the serving cell on which the procedure is ongoing are below threshold(s), measured channel condition(s) from another serving cell of a same base station (e.g., a same gNB) are above configured threshold(s) or are within range(s), measured channel condition(s) from another cell in a different base station (e.g., a different gNB) are above threshold(s), and/or the difference between measured channel condition(s) from the source cell and a different cell are not at (e.g., below or above) configured threshold(s) or are within range(s). A condition may be satisfied if the WTRU has detected a consistent UL LBT failure (e.g., a UL LBT failure detected multiple times during a time duration) on the serving cell on which the small data transfer procedure is ongoing. A condition may be satisfied if the WTRU has received an indication from the base station (e.g., the gNB), such as a DCI or a MAC control element (CE) or a part of the RA msg payload, that indicates to the WTRU to switch the small data transfer procedure to a different cell, a different BWP, and/or a different base station (e.g., a different gNB). A condition may be satisfied if validity of system information has expired, or system information requires an update. A condition may be satisfied if the WTRU has received an indication from the network (e.g. either a DCI or MAC CE or a part of the RA msg payload) to transition into connected mode. A condition may be satisfied if a timing advance validity and/or a timer has expired. A condition may be satisfied if the T304 timer has started or expired.

Based on (e.g., wherein in examples herein based on may be in response to) re-initiating a small data transfer procedure on a different cell (e.g., a cell other than a serving cell), a different cell group, a different base station (e.g., a different gNB), and/or a different BWP, the WTRU may restart a timer (e.g., a T304 timer), for example, if the T304 timer is running. The WTRU may stop the T304 timer, for example, based on a successful completion of the small data transfer procedure (e.g. via a RA or PUSCH procedure), for example, if the completion is at the target cell. If the T304 timer that started in conjunction with a small data transfer procedure expires, the WTRU may initiate a second cell group (SCG) failure procedure (e.g. if the RA is on an SCG cell), initiate an radio link failure (RLF) procedure (e.g. if the RA is on the special cell (SpCell)), initiate an RRC re-establishment procedure, initiate a RA procedure on the source sell, fall back to the source cell, and/or switch to a different BWP or serving cell and initiate a RA procedure.

A WTRU may perform measurements and may report such measurements to the network. For example, based on (e.g., wherein in examples herein based on may be in response to) release to RRC_INACTIVE state, a WTRU may maintain a set of measurement objects (e.g., additional measurement objects) and/or a measurement configuration (e.g., an additional measurement configuration) within the WTRU-stored context. The resources may be a measurement configuration (e.g., an existing measurement configuration) configured while in RRC_CONNECTED state, a subset of measurement objects from a measurement configuration (e.g., an existing measurement configuration) corresponding to whitelisted cells and/or cells within the RNA, and/or a measurement configuration (e.g., a new measurement configuration). While in RRC_INACTIVE state, the WTRU may perform measurements according to the measurement objects and/or measurement configuration described herein, which may be in addition to measurements performed on SSB, and/or as a replacement for SSB measurements. The WTRU may perform measurements associated with an inactive measurement configuration, e.g., if or only if the WTRU is transmitting or receiving small data transmission. In examples, the WTRU may use these measurements to evaluate which resource (e.g., Msg1/Msg3 or MsgA) to use for transmitting small data.

The inactive measurement configuration may contain reporting criteria to report measurements to the network. The WTRU may report inactive measurements, e.g., if the WTRU is transmitting or receiving small data. Based on (e.g., wherein in examples herein based on may be in response to) satisfying a reporting criteria or triggering event, the WTRU may report the event or measurements to the last serving base station (e.g., the last serving gNB). The WTRU may transmit a measurement report using a configured grant resource, and/or UCI, e.g., on MsgA or Msg3 PUSCH.

The base station (e.g., the gNB) may intervene a WTRU's mobility, such as the WTRU's (re) selection to another cell (e.g., a cell other than the last serving cell). For example, the gNB may want to prevent a WTRU from performing RRC_IDLE and/or RRC_INACTIVE state cell (re)selection to the above-mentioned another cell, for example, if the gNB has DL small data to transmit to the WTRU (e.g., see time 207 on the timeline in FIG. 2, wherein the WTRU is in inactive state, an event "case 2: Cell Reselection criteria satisfied" occurs, and the gNB has more SDT DL data to send). To prevent the WTRU from performing cell (re) selection, the WTRU may be configured with a timer and/or a counter value (e.g., see 208 in FIG. 2, wherein the WTRU is in INACTIVE state and receives (e.g., from gNB) reselection prevention indication and starts reselection prevention timer). For example, while the timer/counter is running (e.g., see the time period between 208 and time 207 on the timeline in FIG. 2), the WTRU may refrain from performing RRC_IDLE and/or RRC_INACTIVE state cell (re)selection to a cell other than the last serving cell (e.g., see time 207 on the timeline in FIG. 2, wherein the WTRU is in INACTIVE state, an event "case 2: Cell Reselection criteria satisfied" occurs, and the WTRU delays cell reselection (e.g., step 1 under (b))). The timer may be configured based on (e.g., wherein in examples herein based on may be in response to) release of the WTRU to RRC_IDLE or RRC_INACTIVE state. The WTRU may perform one or more actions (e.g., see 218 in FIG. 2, wherein the WTRU performs actions under (a) in 216), e.g., if the timer (e.g., the reselection prevention timer) expires during a time period where a SDT failure timer is running. The WTRU may perform one or more actions (e.g., see 218 in FIG. 2, wherein the WTRU performs actions under (c) in 220), e.g., if a SDT failure timer expires during a time period where a reselection prevention timer is running.

The timer or counter may begin or restart, for example, based on (e.g., wherein in examples herein based on may be in response to) release of the WTRU to RRC_IDLE or RRC_INACTIVE state; based on (e.g., wherein in examples herein based on may be in response to) a successful reception of DL small data; based on (e.g., wherein in examples herein based on may be in response to) a successful transmission of UL data; and/or based on (e.g., wherein in examples herein based on may be in response to) a reception of a RAN paging message (e.g., an NG RAN paging message). The WTRU may end the timer or counter, for example, based on a reception of an explicit network indication (e.g., an indication that small data transmission is complete; based on (e.g., wherein in examples herein based on may be in response to) a transition from RRC_IDLE or RRC_INACTIVE state to RRC_CONNECTED state; based on (e.g., wherein in examples herein based on may be in response to) a transition from RRC_INACTIVE state to RRC_IDLE state; and/or based on (e.g., wherein in examples herein based on may be in response to) a deconfiguration of a configured grant resource.

A WTRU may be directed by one base station (e.g., one gNB) to another base station (e.g., another gNB, such as a gNB other than the last serving gNB). For example, the WTRU may receive a mobility command from the last serving gNB, or via paging such as RAN paging (e.g., NG-RAN paging). The mobility command may be based on (e.g., wherein in examples herein based on may be in response to) a WTRU transmission of an inactive measurement report using a small data resource. The WTRU may be directed to said another gNB, for example, via one or more of methods disclosed herein, wherein based on (e.g., wherein in examples herein based on may be in response to) one or more of the below example occurrences, the WTRU may perform cell (re)selection to the indicated gNB. For example, the WTRU may receive and apply an updated cell whitelist and/or blacklist, where a subset of originally whitelisted cells may remain available for the WTRU to access. For example, the WTRU may receive a "reject and re-direct" message when attempting to access a cell in RRC_IDLE or RRC_INACTIVE state, where the WTRU may be provided with an explicit cell ID or a set of time frequency resources to access a target gNB. For example, the WTRU may receive DL data from a different gNB than the last serving gNB.

A WTRU may maintain WTRU context for an ongoing small data transfer procedure while transferring to a target base station (e.g., a target gNB).

For example, while in the process of attempting small data transfer to another base station (e.g., another gNB), the last base station (e.g., the last serving gNB) may attempt to trigger a WTRU context release or a RAN node reset (e.g., a NG reset message). The WTRU may perform one or more of the following actions, e.g., to maintain the current WTRU context: ignore the context release or NG reset message; perform an action if a timer or counter expires; and/or connect to a best cell (e.g., based on measurements). Additional latency, and/or re-establishing WTRU context, RRC connection, or RAN context (e.g., NG RAN context) may be avoided.

The WTRU may ignore messages from the gNB to release the WTRU context and/or perform a RAN node reset (e.g., an NG reset message), for example, if the WTRU is in the process of accessing another cell due to pending transfer of small data. The WTRU may apply the received action after successful transmission of small data.

If a timer (e.g., a time period) expires or a counter (e.g., a number of event occurrences) expires (e.g., reaches a pre-defined limit), the WTRU may perform action(s). For example, based on (e.g., wherein in examples herein based on may be in response to) a transition to RRC_INACTIVE or RRC_IDLE state, the WTRU may indicate to the gNB that the WTRU intends to perform small data transmission in RRC_INACTIVE or RRC_IDLE state. The gNB may configure the WTRU with a timer and/or a counter. Times, conditions, and/or resources that may trigger the WTRU to start and/or reset the timer and/or counter may be one or more of the following: based on (e.g., wherein in examples herein based on may be in response to) a transition to RRC_IDLE or RRC_INACTIVE state; based on (e.g., wherein in examples herein based on may be in response to) a reception of a WTRU context release or a RAN node reset (e.g., a NG reset message); based on (e.g., wherein in examples herein based on may be in response to) a reception of UL small data from higher layer(s); based on (e.g., wherein in examples herein based on may be in response to) a successful transmission of small data; based on (e.g., wherein in examples herein based on may be in response to) mobility to a different cell; and/or based on (e.g., wherein in examples herein based on may be in response to) an RNA update.

In examples, while the timer or counter is running, based on (e.g., wherein in examples herein based on may be in response to) a reception of a WTRU context release and/or a RAN node reset (e.g., a NR reset command), the WTRU may store the command in memory and may skip performing the action. Based on (e.g., wherein in examples herein based on may be in response to) a timer expiry, the WTRU may apply the WTRU context release and/or reset command (e.g., NR reset command).

If the WTRU is aware of further small data transmissions, and/or has small data to transfer, the WTRU may transmit a RACH message to a best current cell, e.g., based on measurements. Such RACH message may be to access the cell and transition to RRC_CONNECTED state. Such RACH message may include the small data. Such RACH message may be a small data message with padding bits.

A WTRU may assist a target base station (e.g., a target gNB) with WTRU context retrieval. For example, based on (e.g., wherein in examples herein based on may be in response to) a release to RRC-INACTIVE state, the WTRU may be provided with network-stored WTRU context information (e.g., additional network-stored WTRU context information) to provide to the target gNB (e.g., for the target gNB to obtain the WTRU context information more quickly). The additional network-stored WTRU context may include all or a subset of the WTRU context information. For example, the WTRU may store one or more of the following sets of information: core network WTRU associated signaling reference (e.g., next generation core network (NG-C) WTRU associated signaling reference); signaling transport network layer (TNL) association address at source core network side (e.g., at source NG-C side); WTRU Security Capabilities; AS Security Information; WTRU Aggregate Maximum Bit Rate; package data unit (PDU) Session Resources To Be Setup List; RRC Context; Mobility Restriction List; Index to radio access technology (RAT)/Frequency Selection Priority; core network mobility restriction list container (e.g., 5G core network (5GC) Mobility Restriction List Container); WTRU sidelink aggregate maximum bit rate (e.g., NR WTRU Sidelink Aggregate Maximum Bit Rate or LTE WTRU Sidelink Aggregate Maximum Bit Rate); WTRU Radio Capability ID.

The WTRU may be provided with a list of cells to which the WTRU may provide the context information (e.g., additional WTRU context information), e.g., based on (e.g., wherein in examples herein based on may be in response to) a release to RRC_INACTIVE state. The WTRU may be configured with a timer value and/or a counter value within which the additional WTRU context may be considered valid. The WTRU may discard the stored WTRU context information, and/or attempt to update the stored information (e.g., via access to a base station (e.g., a gNB)).

The WTRU context may be maintained in a number of base stations (e.g., gNBs). For example, the WTRU context may be stored within a number of neighboring base stations (e.g., neighboring gNBs). The WTRU context may be active in the serving base station (e.g., the serving gNB). Based on (e.g., wherein in examples herein based on may be in response to) a release to RRC_INACTIVE state, the WTRU may be provided with a list of base stations (e.g., gNBs) (or a list of cells) where the WTRU context is stored. The list may be defined as a WTRU Context Area. The list may be independent of any other list of base stations (e.g., gNBs), or be the same as a list for another purpose, such as a RNA. The WTRU may assume that a base station (e.g., a gNB) or a cell will store the WTRU context, for example, indefinitely; subject to a timer/or counter; and/or until the WTRU changes state (e.g., until the WTRU transitions to RRC_CONNECTED or RRC_IDLE state).

Times and/or resources that the above-mentioned timer and/or counter may start and/or reset may be: based on (e.g., wherein in examples herein based on may be in response to) a transition to RRC_IDLE or RRC_INACTIVE state; based on (e.g., wherein in examples herein based on may be in response to) a reception of a WTRU context release or a RAN node reset (e.g., a NG reset message); based on (e.g., wherein in examples herein based on may be in response to) a reception of UL small data from higher layer(s); based on (e.g., wherein in examples herein based on may be in response to) a successful transmission of small data; based on (e.g., wherein in examples herein based on may be in response to) a mobility to a cell (e.g., a new cell); and/or based on (e.g., wherein in examples herein based on may be in response to) an RNA update.

The WTRU may assume that the network will provide the WTRU context to surrounding base stations (e.g., surrounding gNBs) within the WTRU context area, e.g., subject to one or more of the following conditions: the WTRU has indicated (e.g., to the network) that it has small data to transfer based on (e.g., wherein in examples herein based on may be in response to) a release to RRC_INACTIVE state; the WTRU has indicated (e.g., to the network) a capability to transmit small data; the WTRU has indicated (e.g., to the network) measurements suggesting that it is about to perform mobility; and/or the network (e.g., the gNB) has received a small data transmission from the WTRU.

A WTRU may perform PDCP maintenance and/or PDCP re-establishment for small data transmission.

The WTRU may maintain header compression.

Based on (e.g., wherein in examples herein based on may be in response to) a small data transfer to a base station (e.g., a gNB other than the last serving gNB), the WTRU may maintain all or a subset of its PDCP configuration, for example, a header compression configuration. The header compression configuration may be a robust header compression (ROHC) configuration. This may occur during PDCP re-establishment. ROCH protocol may be maintained via a parameter or field (e.g., drb-ContinueROHC), for example, for an unacknowledged mode data radio bearer(s) (UM DRB(s)) and/or an acknowledged mode data radio bearer(s) (AM DRB(s)) configured for small data transmission. Ethernet header compression (EHC) protocol may be maintained via a parameter or field (e.g., drb-ContinueEHC-UL), for example, for an UM DRB(s) and/or an AM DRB(s) configured for small data transmission. The WTRU may apply this ROHC and/or EHC configuration to some PDCP service data units (SDUs) (e.g., all PDCP SDUs already associated with PDCP sequence numbers (SNs)) in an ascending order of COUNT values associated to the PDCP SDUs, for example, prior to a PDCP entity re-establishment.

A WTRU maintaining a PDCP configuration and/or a subset of aspects of the PDCP configuration may be configured explicitly or implicitly. For example, the WTRU (e.g., a WTRU with small data) maintaining a PDCP configuration and/or a subset of aspects of the PDCP configuration may be explicitly configured via a base station (e.g., a gNB). An explicit configuration may be provided to the WTRU, for example, during the RRC release message to INACTIVE state. For example, a WTRU may be implicitly notified to maintain aspect(s) of a PDCP configuration. If the WTRU is configured to transmit small data in INACTIVE mode, the WTRU may autonomously maintain aspects of its PDCP configuration. The WTRU may enable drb-ContinueROHC and/or drb-ContinueEHC-UL, for example, if the field(s) are not currently configured.

A WTRU may apply one-shot ciphering or temporary ciphering and/or integrity protection.

A WTRU may apply a ciphering and/or integrity protection algorithm and key during a PDCP entity re-establishment procedure, for example, based on an initiation of the PDCP re-establishment during a small data transmission. The ciphering and/or integrity protection algorithm and key may be provided by upper layer(s). The WTRU may be provided with a temporary or one-shot ciphering and/or integrity protection key to be used (e.g., during a small data transmission), for example, based on (e.g., wherein in examples herein based on may be in response to) a release of the WTRU to INACTIVE. This key may be provided explicitly or implicitly. This key may be provided, for example, if the WTRU explicitly indicates that it has small data ready for transmission (e.g., requires small data transmission) (e.g., an explicit request for a key to apply to the payload), or implicitly, for example, if the WTRU has one or more DRBs configured for small data transmission, based on (e.g., wherein in examples herein based on may be in response to) a release to INACTIVE state.

A WTRU may apply the one-shot or temporary ciphering and/or integrity algorithm and key provided by a last serving base station (e.g., a last serving gNB) to an initial transmission on traffic assigned to DRBs associated with small data transmission, for example, based on (e.g., upon) an initiation of small data transfer to a receiving base station (e.g., a receiving gNB). The WTRU may provide the receiving gNB with an I-RNTI. The receiving gNB may perform one or more of the following: store the small data from the WTRU; via the I-RNTI, locate the last serving gNB; receive the temporary or one-shot integrity and/or ciphering key and algorithm used by the WTRU for small data transmission.

A WTRU may apply this ciphering key and/or integrity protection algorithm to some PDCP SDUs (e.g., all PDCP SDUs already associated with PDCP SNs) in an ascending order of the COUNT values associated with the PDCP SDUs, for example, prior to the PDCP entity re-establishment.

A WTRU may receive an updated ciphering and/or integrity key and/or algorithm from the receiving gNB, for example if the WTRU indicates subsequent data transmission(s).

Cell access for a WTRU may be prioritized during small data transfer. A WTRU may notify a target base station (e.g., a target gNB or a target cell) of prioritized access for purposes of small data transfer. For example, the WTRU may include an RRC resume request or RRC message, an indication for subsequent small data, and/or an indication on a preference to transition to connected mode (e.g., for a part of the small data payload, or for a part of the small data transfer procedure (e.g. a part of MsgA, or a part of Msg3)). Such assistance information may be used (e.g., by an anchor or a last serving base station (e.g., a last serving gNB)) to decide whether to relocate the WTRU context to the target gNB (or the target cell). The WTRU may selectively include such assistance information (e.g., prioritized cell access information), for example, if under one or more of the following conditions: the WTRU is connecting to a target cell; a target cell is in a different RNA or tracking area (e.g. the WTRU context may not be transferred or known at the target cell or the target gNB); or a logical channel included in a small data PDU, for example, includes (or is configured with) a flag (e.g., an identifier) for allowing the inclusion of RRCResumeRequest. The WTRU may be configured per LCH, e.g. using dedicated RRC signaling, with a flag (e.g., an identifier) for allowing the WTRU to include RRCResumeRequest for a part of the small data transfer procedure. An indication of subsequent transmission(s) may include one or more of the following: an indication flag (e.g., an indication identifier) indicating more buffered small data to be transmitted in INACTIVE state; an indication flag (e.g., an indication identifier) indicating more small data is expected to arrive; a traffic pattern; a buffer status report (BSR) MAC CE; a BSR MAC CE which reports buffer status for (e.g., only for) SDT LCHs/DRBs; a data volume report; an expected data arrival volume report; or a scheduling request. An RRC message may include one or more of the following: a context transfer request or message (e.g. a retrieve WTRU context request message), which may contain the WTRU identity (e.g. I-RNTI or cell RNTI (C-RNTI)); the target cell; the anchor cell; an indication for subsequent small data (e.g. a BSR, or a flag indication (e.g., an identifier indication)); or a small data message. The WTRU may include a scheduling request (e.g., multiplexed in PUSCH (e.g., a PUSCH transmission) or multiplexed in the small data PDU) that indicates to the gNB that more small data is expected and/or buffered. For example, the scheduling request may be used as a means (e.g., used as assistance information) to inform the gNB that more small data is expected and/or buffered and/or a subsequent transmission is expected. If the WTRU is in an inactive state, an SR (e.g., multiplexed on a PUSCH transmission in the physical layer) may be used to indicate a subsequent transmission.

A data volume report (e.g., an expected data volume report) may be determined based on a number of bits expected to arrive at the WTRU buffer, for example, within a period of time. A WTRU may obtain (e.g., compute) an amount of expected data to arrive, for example, based on a traffic pattern. A WTRU may report data from (e.g., only from) LCHs for which a periodic traffic pattern is applied and/or configured. A WTRU may send (e.g., report) an indication for subsequent small data and/or a BSR as a part of the assistance information, for example, if the amount of buffered and/or expected small data for a subsequent transmission is above a value (e.g., a configured or predetermined threshold).

A WTRU may be configured with a subset of RACH and/or PUSCH resources associated with indicating RRCResumeRequest, preference to transition into connected mode, and/or an expectation of subsequent small data transmission.

A WTRU may do one of more of the following: perform an anchor relocation; include assistance information for a WTRU context relocation; send a request for an anchor relocation; send an RRC resume request; send an RRC message associated with an anchor relocation and/or a WTRU context transfer, e.g., if one or more of the following is met: an amount of small data transmitted, buffered, or to be transmitted is above a value (e.g., a configured or predetermined threshold); the WTRU moves to a serving cell in a different RAN-based notification area (RNA) from the anchor cell or the last serving cell; an indication for subsequent indication is included in a small data PDU, and/or the small data PDU contains a segmented service data unit (SDU); the WTRU has more small data buffered after constructing the small data PDU; an amount or volume of subsequent small data is above a value (e.g., a configured or predetermined threshold); latency associated with the small data PDU transmission is below or at a value (for example, the WTRU may send a request for an anchor relocation if the latency associated with the small data PDU transmission is below or at a configured or predetermined threshold), wherein if the latency is above the configured or predetermined threshold, the WTRU may avoid the anchor relocation and/or context transfer and rely on the receiving cell to forward the data to the anchor cell and/or the last serving gNB; or the small data multiplexed in the PDU is from a LCH or DRB configured with an anchor relocation possible flag (e.g., an anchor relocation identifier indicating anchor relocation is allowed), wherein the WTRU is be configured per DRB or per LCH with such flag.

A WTRU may obtain (e.g., compute) an amount of buffered small data volume based on (e.g., as function of) one or more of the following: DRB(s) or LCH(s) configured for small data transfer, and/or a period (e.g., a predetermined or configured period). For example, a WTRU may compute the amount of buffered small data volume as a total number of bits stored for all LCHs (or DRBs) applicable for (e.g. configured for) small data transmission, e.g., after constructing a PDU for transmission associated with a given transmission time interval (TTI). The WTRU may include buffered data available for transmission in one of more of: a RLC layer, a PDCP layer, or a RRC layer.

Figure 2:
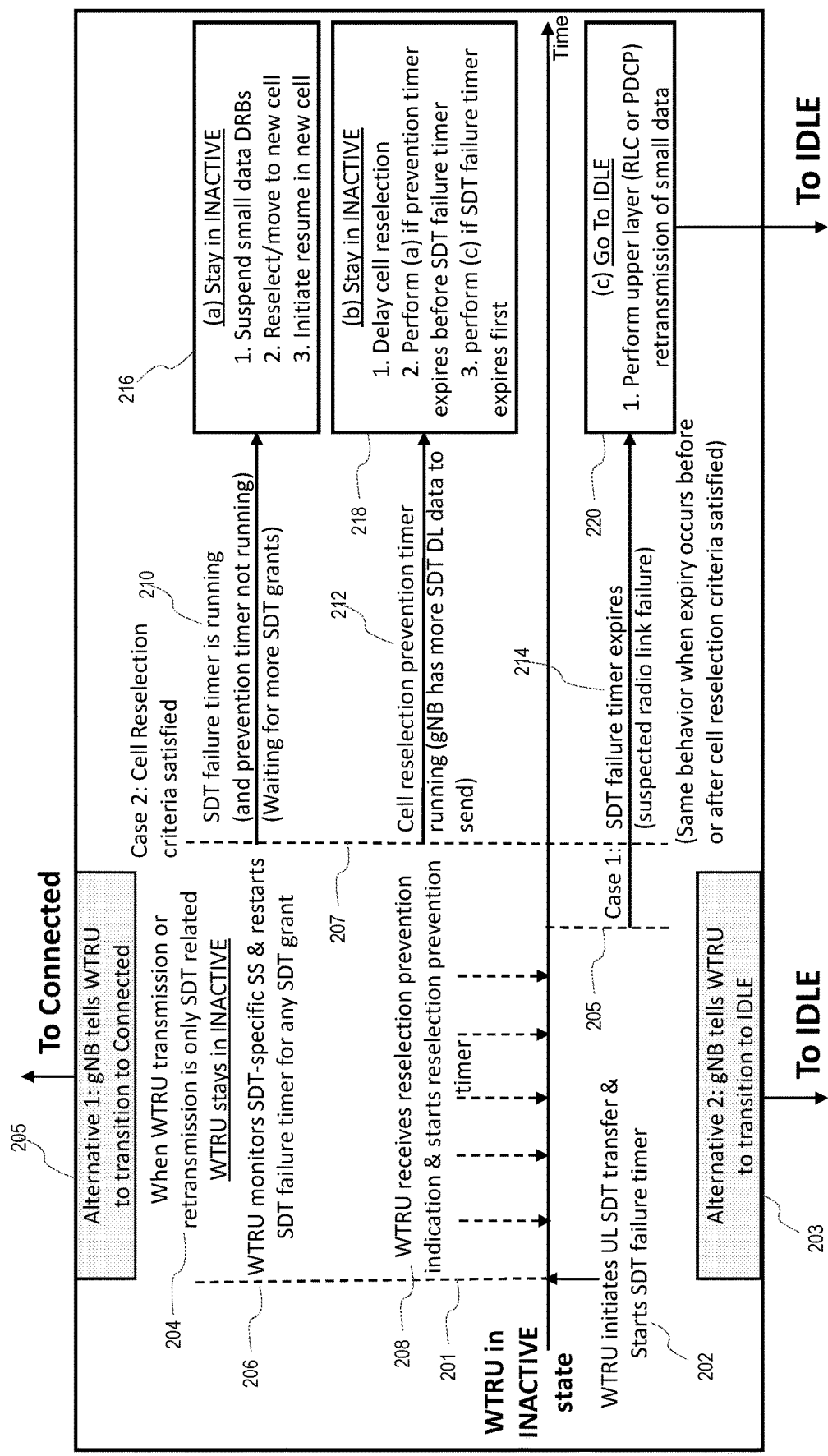
FIG. 2 illustrates an example operation related to small data transmission for an example WTRU operating in inactive state.

FIG. 2 illustrates an example operation related to small data transmission for an example WTRU operating in inactive state.

A WTRU may handle small data failure(s) and/or cell reselection as described herein (e.g., if the WTRU is in inactive state as described in FIG. 2).

A SDT failure timer (e.g., see WTRU actions 202 and 206 in FIG. 2) may be used in association with the small data failure(s).

A WTRU may start a timer (e.g., a SDT timer, such as a SDT failure timer described in WTRU action 202 in FIG. 2) if (e.g., after) one or more of the following is satisfied: the WTRU transmits a small data, such as a small data PDU (e.g., see WTRU action 202 in FIG. 2, and WTRU action 204 in FIG. 2 wherein the WTRU stays in inactive state), which may be a new PDU that is different from the current or previous PDU; the WTRU transmits a PDU that includes a subsequent small data indication (e.g. a BSR MAC CE, a small data BSR, or a flag/bit indicating subsequent small data); the WTRU transmits a segmented PDU, the WTRU retransmits a small data PDU (e.g., see WTRU action 204 in FIG. 2, wherein the action is performed, e.g., if WTRU retransmission is SDT related (e.g., only SDT related)); the WTRU receives a NACK for a small data transport block (TB) or an associated hybrid automatic repeat request (HARQ) process; the WTRU receives a grant for a subsequent small data transmission or retransmission (e.g., see WTRU action 206 in FIG. 2, wherein the WTRU restarts a SDT failure timer for a SDT grant received (e.g., any SDT grant received)); the WTRU receives a random access downlink message (e.g. MsgB, random access response (RAR), fallback RAR); the WTRU receives a timing advance value (e.g. in a MAC CE or in a RAR); the WTRU receives an indication by DCI addressed to the WTRU's RNTI (e.g. I-RNTI, C-RNTI, configured scheduling (CS)-RNTI or SDT-RNTI); the WTRU changes bandwidth part(s); the WTRU changes serving cell(s); the WTRU changes cell group(s); the WTRU performs mobility operation(s) (e.g., mobility to another base station (e.g., another gNB) in a different RNA (or a base station (e.g., a gNB) that doesn't have a WTRU context); or if the SDT transmission by the WTRU has been or is performed on a CG.

The WTRU may stop the SDT timer, for example, based on (e.g., wherein in examples herein based on may be in response to) determining a HARQ-ACK value as ACK for the transmitted small data PDU(s) (e.g., if the SDT timer is maintained per HARQ process) or for all transmitted small data PDUs (e.g., if the SDT timer is maintained per MAC entity). While the SDT timer is running (e.g., see FIG. 2, such as the time period between WTRU action 202 and time 207 on the timeline, wherein the event "case 2: cell reselection criteria satisfied" occurs, and the time period between WTRU action 202 and time 205 on the timeline in FIG. 2, wherein the event "case 1: SDT failure timer expires" occurs), the WTRU may monitor for a PDCCH transmission (e.g., see WTRU action 206 in FIG. 2, wherein WTRU monitors SDT-specific SS). In examples, the PDCCH transmission may be addressed to a certain RNTI (e.g. I-RNTI, C-RNTI, CS-RNTI or SDT-RNTI). The PDCCH transmission may be on a configured coreset and/or a configured search space (e.g., see a SDT-specific search space (SS) described in WTRU action 206 in FIG. 2).

After an expiry of the SDT timer (e.g., see time 205 on the timeline in FIG. 2, wherein an event "case 1: SDT failure timer expires" occurs) and/or (re)selecting a cell (e.g., a cell different from the current cell) while the SDT timer is running (e.g., see time 207 on the timeline in FIG. 2, wherein an event "case 2: cell reselection criteria satisfied" occurs and the WTRU performs action 216, wherein the WTRU stays in inactive state (e.g., in (a)) and reselects a new cell (e.g., in step 2 under (a))), the WTRU may perform one or more of the following: perform a RRC re-establishment; initiate a random access procedure; transition to IDLE mode (e.g., see time 205 on the timeline in FIG. 2, wherein the WTRU performs action 220, including going to IDLE mode (e.g. in (c))); trigger an RLC or PDCP retransmission (e.g., see time 205 on the timeline in FIG. 2, wherein the WTRU performs action 220, including performing upper layer retransmission of small data (e.g., in step 1 under (c)); trigger an RLC status report, include an RRC connection resume in a random access message (e.g., see time 207 on the timeline in FIG. 2, wherein an event "case 2: cell reselection criteria satisfied" occurs, and the WTRU stays in inactive state (e.g. in (a)) and initiates resume in a new cell (e.g., in step 3 under (a))) or an indication to transition to a connected mode; attempt to retransmit the SDT PDU(s) (e.g., using a different SDT method or resource); increase a number of repetitions for the SDT PDU and/or retransmit on a different beam(s); increase a transmit power; change a selected modulation and coding scheme (MCS) (e.g. to a more robust MCS) or select a different CG (e.g., a CG with a more robust MCS); change bandwidth part(s) (BWP) (e.g., to the default or initial BWP); start a radio link monitoring (RLM) and/or radio link failure (RLF) procedure(s); start a beam failure detection (BFD) and/or beam failure recovery (BFR) procedure; report a SDT failure in a MAC CE; perform or request an anchor relocation; provide assistance information for an anchor relocation; suspend or reestablish DRB(s) (e.g., small data DRBs or all DRBs) (e.g., see time 207 on the timeline in FIG. 2, wherein an event "case 2: cell reselection criteria satisfied" occurs, and the WTRU stays in inactive state (e.g., in (a)) and suspends small data DRBs); discard security key(s); or discard a WTRU context.

A WTRU may apply the SDT timer for a subset of SDT transmission approaches or resources (e.g. only for a CG approach or for a subset of SDT resources). The WTRU may select a timer value (e.g., a first timer value) if the SDT PDU has been transmitted on a CG, and another value (e.g., a second timer value) if the SDT PDU is transmitted on RACH-based SDT resource(s).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:
1. A wireless transmit-receive unit (WTRU) associated with a first cell, the WTRU comprising:
   a processor configured to:
     receive configuration information indicating a search space and a duration of a time period, wherein the time period is associated with small data transmission;
     receive a first small data transmission and start tracking the time period;

monitor for a downlink transmission in the search space during the time period;
if the downlink transmission is received during the time period, receive a second small data transmission and restart the time period, wherein the downlink transmission comprises a downlink transmission grant; and
if a condition for cell reselection is satisfied during the time period or the restarted time period:
select a second cell, and
perform a random access procedure associated with the second cell, wherein the random access procedure is further associated with small data transmission and comprises sending a request to resume a radio resource control (RRC) connection.

2. The WTRU of claim 1, wherein the processor is further configured to:
determine that the downlink transmission is not received during the time period, wherein the condition for cell reselection is satisfied based on the determination that the downlink transmission is not received during the time period.

3. The WTRU of claim 1, wherein the processor is further configured to:
receive a small data transmission, wherein the small data transmission is a third small data transmission, a retransmission of the first small data transmission, or a retransmission of the second small data transmission.

4. The WTRU of claim 3, wherein the small data transmission is received using resources associated with the second cell.

5. The WTRU of claim 1, wherein the WTRU is operating in an inactive state.

6. The WTRU of claim 1, wherein the processor is further configured to:
determine whether the downlink transmission is received during the time period; and
change, based on a determination that the downlink transmission is not received during the time period, a state from an inactive state to an idle state and receive a retransmission of the first small data transmission.

7. The WTRU of claim 6, wherein the retransmission of the first small data transmission is received via an upper layer.

8. The WTRU of claim 1, wherein if the condition for cell reselection is satisfied during the time period or the restarted time period, the processor is further configured to:
suspend a data radio bearer (DRB) associated with small data transmission.

9. A method associated with a first cell, the method comprising:
receiving configuration information indicating a search space and a duration of a time period, wherein the time period is associated with small data transmission;
receiving a first small data transmission and start tracking the time period;
monitoring for a downlink transmission in the search space during the time period;
if the downlink transmission is received during the time period, receiving a second small data transmission and restart the time period, wherein the downlink transmission comprises a downlink transmission grant; and
if a condition for cell reselection is satisfied during the time period or the restarted time period:
selecting a second cell, and
performing a random access procedure associated with the second cell, wherein the random access procedure is further associated with small data transmission and comprises sending a request to resume a radio resource control (RRC) connection.

10. The method of claim 9, further comprising:
determining that the downlink transmission is not received during the time period, wherein the condition for cell reselection is satisfied based on the determination that the downlink transmission is not received during the time period.

11. The method of claim 9, further comprising:
receiving a small data transmission, wherein the small data transmission is a third small data transmission, a retransmission of the first small data transmission, or a retransmission of the second small data transmission.

12. The method of claim 11, wherein the small data transmission is received using resources associated with the second cell.

13. The method of claim 9, further comprising:
determining whether the downlink transmission is received during the time period; and
changing, based on a determination that the downlink transmission is not received during the time period, a state from an inactive state to an idle state and receive a retransmission of the first small data transmission.

14. The method of claim 13, wherein the retransmission of the first small data transmission is received via an upper layer.

15. The method of claim 9, wherein if the condition for cell reselection is satisfied during the time period or the restarted time period, the method further comprises:
suspending a data radio bearer (DRB) associated with small data transmission.

* * * * *